May 26, 1964 A. J. FINK 3,134,872

CONVERTIBLE DROP-OUT FUSED CIRCUIT INTERRUPTERS

Filed Oct. 26, 1959 7 Sheets-Sheet 1

WITNESSES:

Bernard R. Gieguez

Wm. L. Groome

INVENTOR
Austin J. Fink

BY

Willard R. Crout
ATTORNEY

May 26, 1964 A. J. FINK 3,134,872

CONVERTIBLE DROP-OUT FUSED CIRCUIT INTERRUPTERS

Filed Oct. 26, 1959 7 Sheets-Sheet 2

May 26, 1964 A. J. FINK 3,134,872

CONVERTIBLE DROP-OUT FUSED CIRCUIT INTERRUPTERS

Filed Oct. 26, 1959

7 Sheets-Sheet 3

May 26, 1964 A. J. FINK 3,134,872

CONVERTIBLE DROP-OUT FUSED CIRCUIT INTERRUPTERS

Filed Oct. 26, 1959 7 Sheets-Sheet 4

United States Patent Office 3,134,872
Patented May 26, 1964

3,134,872

CONVERTIBLE DROP-OUT FUSED CIRCUIT INTERRUPTERS

Austin J. Fink, Bloomington, Ind., assignor to Westinghouse Electric Corporation, East Pittsburgh, Pa., a corporation of Pennsylvania Filed Oct. 26, 1959, Ser. No. 848,596
22 Claims. (Cl. 200—114)

This invention relates, in general, to electric circuit interrupters, and, more specifically, to dropout fuse cutouts.

A general object of the present invention is to provide a novel type of circuit interrupter which will effect rapid and effective disconnection of the controlled circuit.

A more specific object of the present invention is to provide an improved and more effective dropout type of fuse cutout.

Another object of the present invention is to provide a highly effective fuse cutout which may be readily converted from non-dropout operation to dropout operation by a simple and easily performed manipulation.

A further object of the present invention is to provide an improved fusible device having a support which is resiliently mounted upon a wall, post or cross-arm, to minimize the shock imposed upon the fusible device during the operation thereof. This is of particular advantage during the blowing of fuses during high fault-current interruption when the jet reaction forces encountered are considerable.

Another object of the invention is to provide an improved fusible device in which a simplified toggle mechanism is employed having few parts and which is relatively inexpensive to manufacture.

Yet a further object of the present invention is to provide an improved line-clamping contact construction for a circuit interrupter.

Another object of the invention is to provide an improved enclosed type of fusible cutout in which improved and relatively inexpensive clamp-type line terminals are cemented within suitable recesses provided in the enclosed housing.

Another object is to provide an improved fuse cutout having a combined latch and fuse-link flipper device, the functioning of which prevents the imposition of undue stress upon the fuse link, and, in addition, prevents breaking of the associated toggle mechanism.

Another object of the invention is to provide an improved toggle mechanism for a fusible device, which is of the convertible type—that is, adapted for dropout operation or non-dropout operation, in which a biased flipper device serves as a latch to prevent breaking of the toggle mechanism during dropout operation, and in which said flipper device serves during non-dropout operation as a fuse-link impelling device to assist in lengthening the established arc. Preferably, the flipper device serves, in addition, at all times to prevent the imposition of excessive tensile force upon the relatively weak fuse-link assembly.

In United States Patent 2,359,153, issued September 26, 1944, to Herbert L. Rawlins, entitled "Circuit Interrupter," and in United States Patent 2,361,240, entitled "Electrical Apparatus," issued October 24, 1944, to Herbert L. Rawlins and Eugene H. Fischer, both of said patents being assigned to the assignee of the instant appilcation, improved fusible cutout devices are described and claimed having improved operating mechanisms and contact structures. It is a further object of the present invention to improve upon the fusible devices of the foregoing patents, rendering them more suitable for high-current operation, minimizing the establishment of shock conditions during interruption, simplifying the operating mechanism, improving the contact structure and also simplifying the conversion process from non-dropout operation to dropout operation.

Another object of the present invention is the provision of an improved enclosed fuse cutout having a minimum number of joints for the current path through the cutout.

Another object of the invention is to provide an improved barrier construction between the spaced contact assemblies disposed within the fuse housing.

An ancillary object of the present invention is the provision of an improved fuse-link flipper device controlling the tension exerted upon the fuse-link assembly and also serving as an indicator when the fuse cutout is adjusted for non-dropout operation.

Still a further object of the invention is an improved clamping terminal for the fuse-link pigtail to prevent capstan action during manual tightening of the clamping terminal during fusing of the fuse holder.

Another object of the invention is the provision of an improved enclosed-type fuse cutout in which the assembly steps during manufacture of the cutout are minimized, a less number of mechanism parts are employed, and in which the resulting cutout is more rugged and simpler to service during field operation.

Further objects and advantages will readily become apparent to those skilled in the art upon reading the following specification, taken in conjunction with the drawings, in which.

Figures 6, 7, 14, 15:
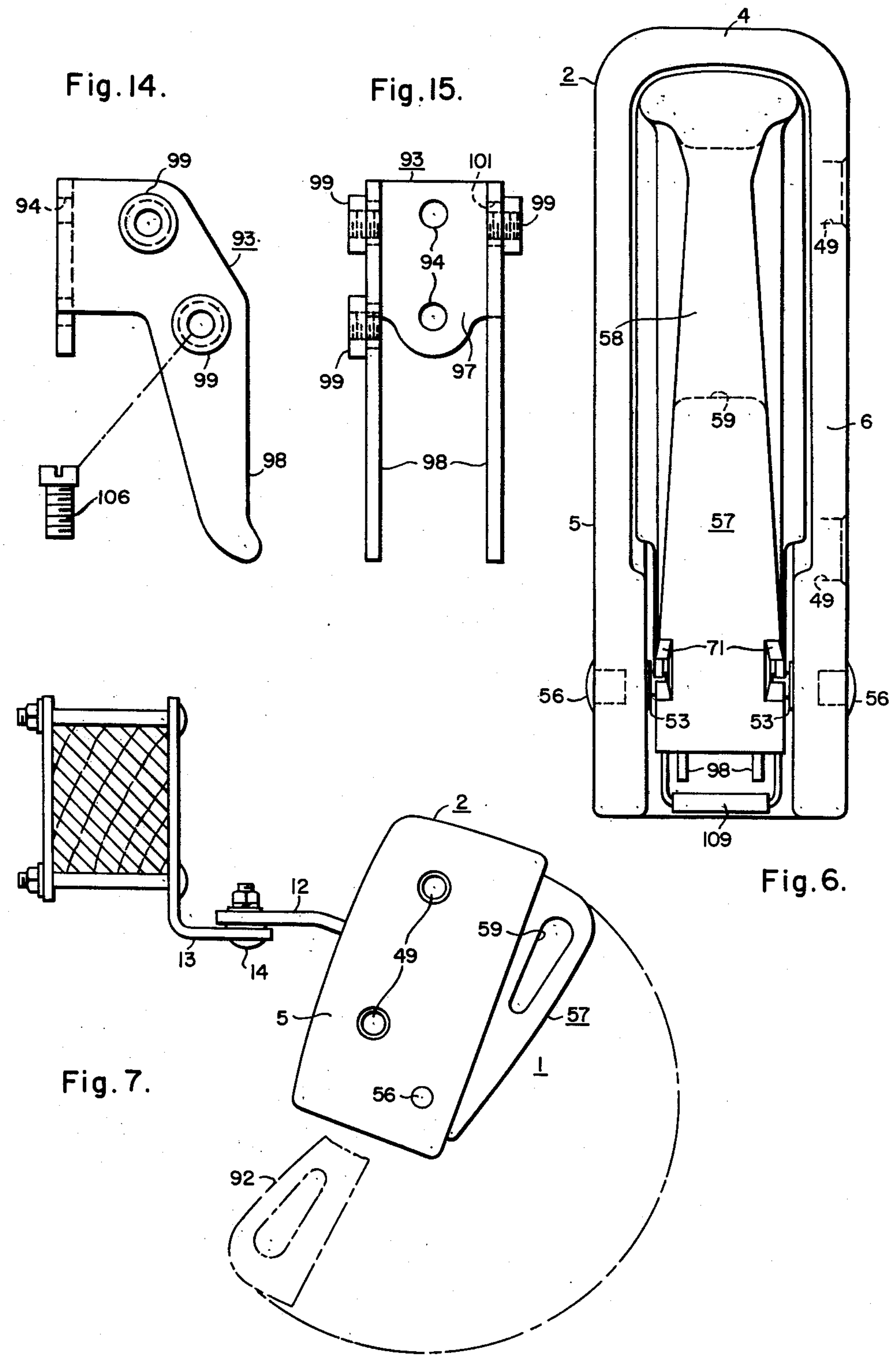
FIG. 6 is a front elevational view of the entire fuse cutout, with the fuseholder door shown in closed position, the cutout being conditioned for non-dropout operation, and the fuse-link flipper device being shown in its downward indicating position, indicating a blown-fuse condition.
FIG. 7 illustrates a side elevational view of the improved enclosed fuse cutout of the present invention mounted on a cross-arm in the operative condition.
Figure 19:
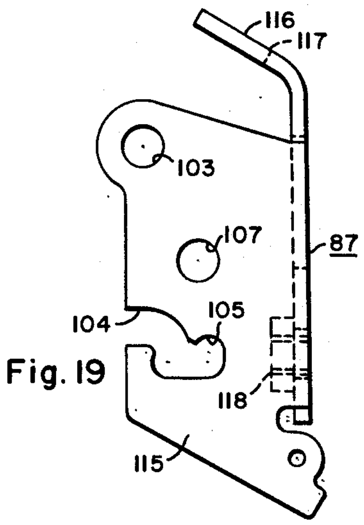
Figure 20:
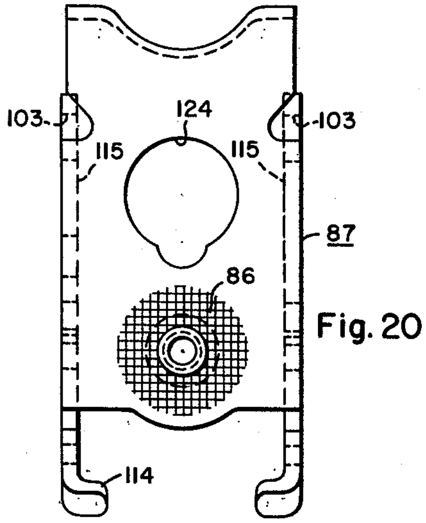
Figure 21:
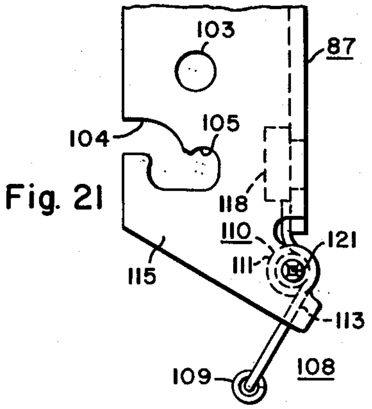
Figure 22:
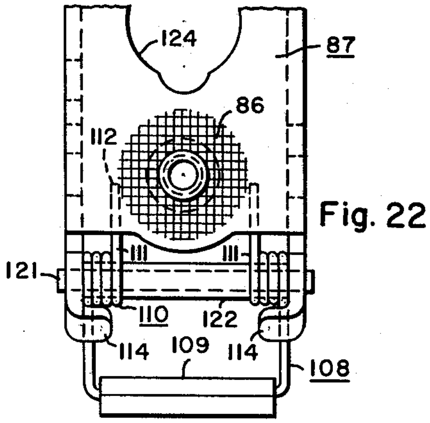
Figures 16, 17, 18:
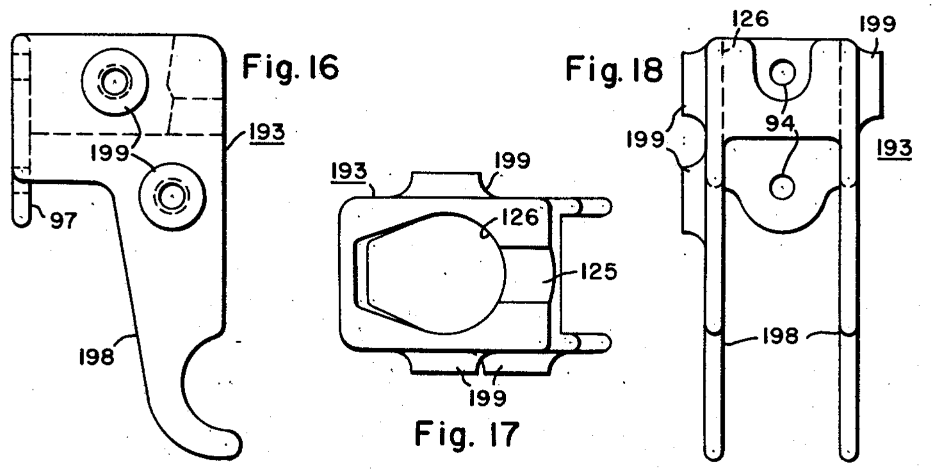
Figure 23:
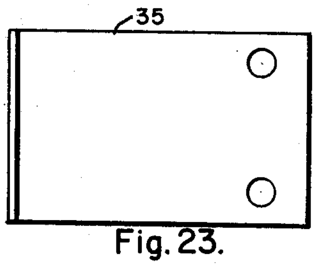
Figure 25:
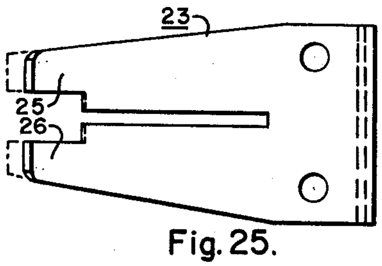
Figure 24:
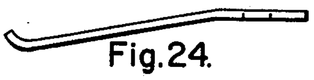
Figure 26:
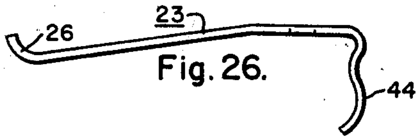
Figure 27:
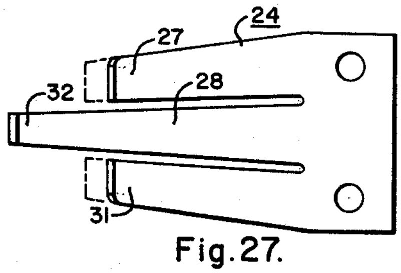
Figure 29:
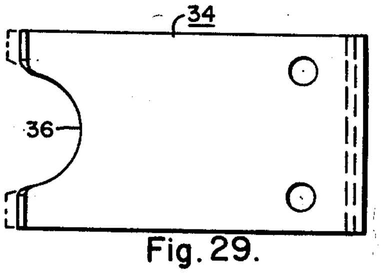
Figure 28:
Figure 30:
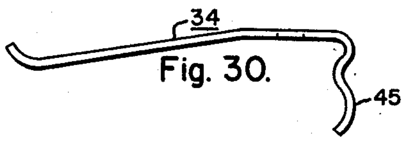
Figures 31, 32, 33:
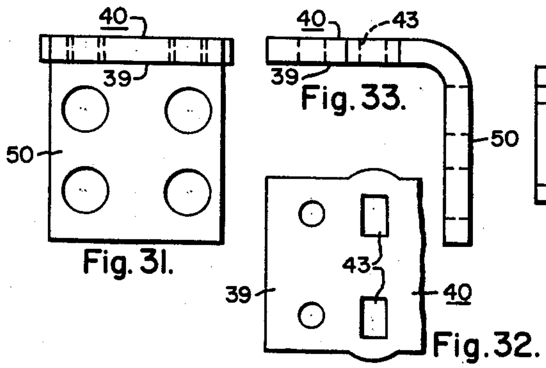
Figure 34:
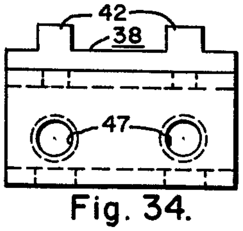
Figure 35:
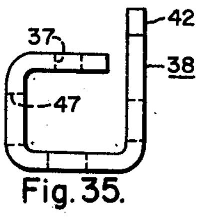

FIGS. 14 and 15, respectively, are side elevational and rear elevational views of the latch bracket, which is secured to the cutout door;

FIGS. 16, 17 and 18, respectively, illustrate side elevational, top plan and rear elevational views of a modified type of cast latch bracket having additional strength for higher interrupting capacities, and adapted to be secured to the cutout door of a higher-rated fuse cutout;

FIGS. 19 and 20, respectively, illustrate side elevational and rear elevational views of the support link or terminal hinge, which forms a part of the door assembly of the improved cutout;

FIGS. 21 and 22, respectively, illustrate side elevational and rear elevational views, of the assembly of the spring-biased, fuse-link flipper device mounted upon the terminal hinge;

FIGS. 23 and 24, respectively, illustrate top plan and side elevational views of the backup spring for the lower contact assembly of the fuse cutout;

FIGS. 25 and 26, respectively, illustrate top plan and side elevational views of the contact for the upper contact assembly of the fuse cutout;

FIGS. 27 and 28, respectively, illustrate top plan and side elevational views of the backup spring for the upper contact assembly of the fuse cutout;

FIGS. 29 and 30, respectively, illustrate top plan and side elevational views of the contact for the lower contact assembly of the fuse cutout;

FIGS. 31–33, respectively, illustrate front elevational, fragmentary inverted plan, and side elevational views of the mounting bracket for the contact assemblies; and FIGS. 34 and 35, respectively, illustrate front elevational and side elevational views of the substantially elongated, box-shaped support terminal for each contact assembly.

Figures 1, 2:
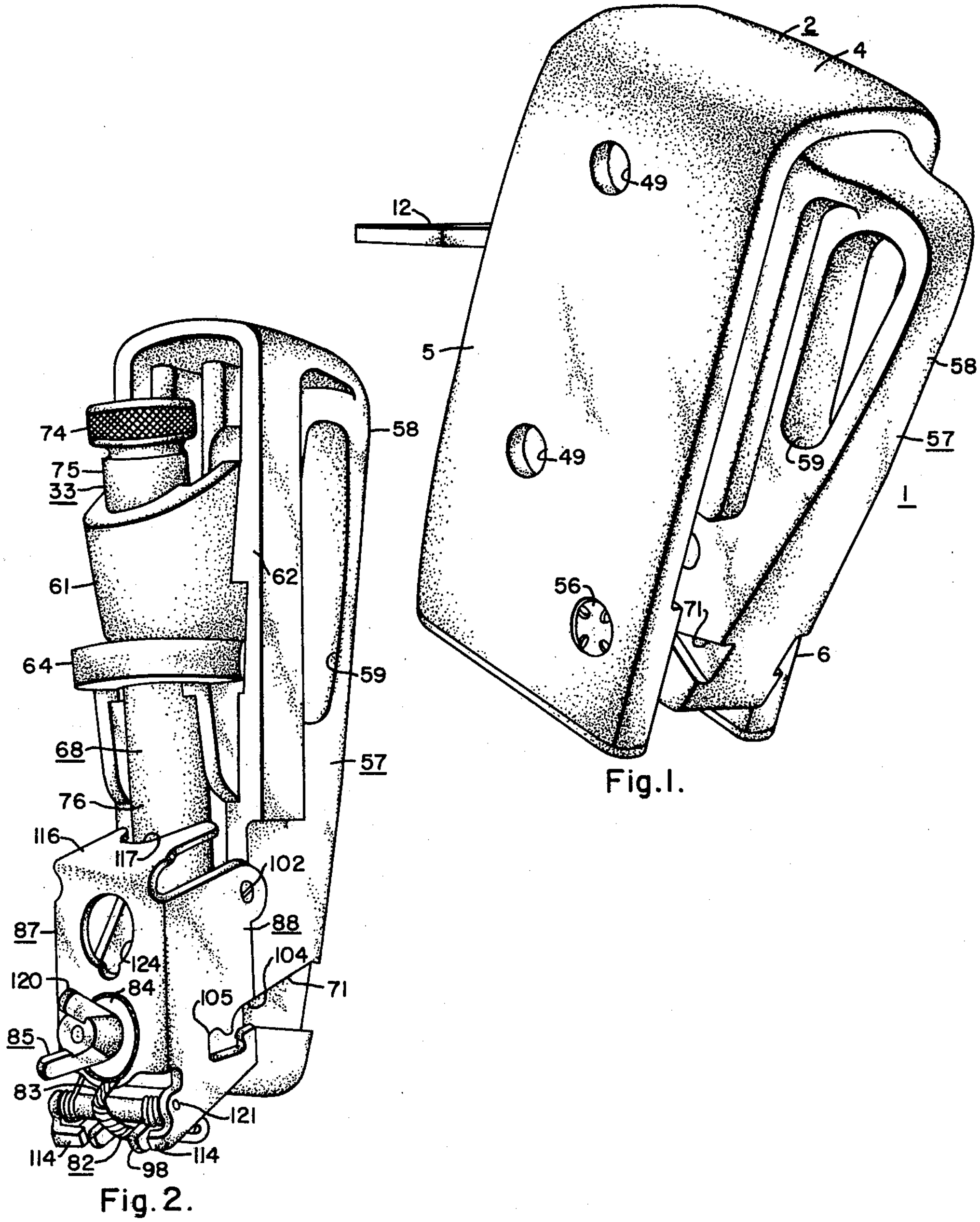
FIG. 1 is a perspective view of the improved enclosed fuse cutout of the present invention, with the fuse-holder door closed, and the associated fuse link in its intact condition.
FIG. 2 is a perspective rear view of the fuseholder door alone, the view showing the toggle mechanism in its set position as effected by the clamped fuse-link pigtail or cable.

Referring to the drawings, and more particularly to FIG. 1 thereof, the reference numeral 1 generally designates an enclosed fuse cutout. It will be noted that generally the fuse cutout 1 includes an insulating housing 2, which may be formed of any desired insulating material, such as porcelain. Preferably, in order to obtain high dimensional fidelity, the porcelain box 2 is fabricated from a damp mix of clay rather than a liquid mix, as used in wet-process cutout manufacture. The damp mix of clay is pressed into a die using high mechanical pressure, while drawing a vacuum on the press. As less water is removed in the firing process, shirnkage can be controlled more closely, resulting in a more accurately dimensioned box. Reference may be had to United States Patent 2,361,240, issued October 24, 1944, to Herbert L. Rawlins and Eugene H. Fischer, and assigned to the assignee of the present invention, for a detailed description of the steps employed in fabricating the porcelain box 2.

Figure 3:
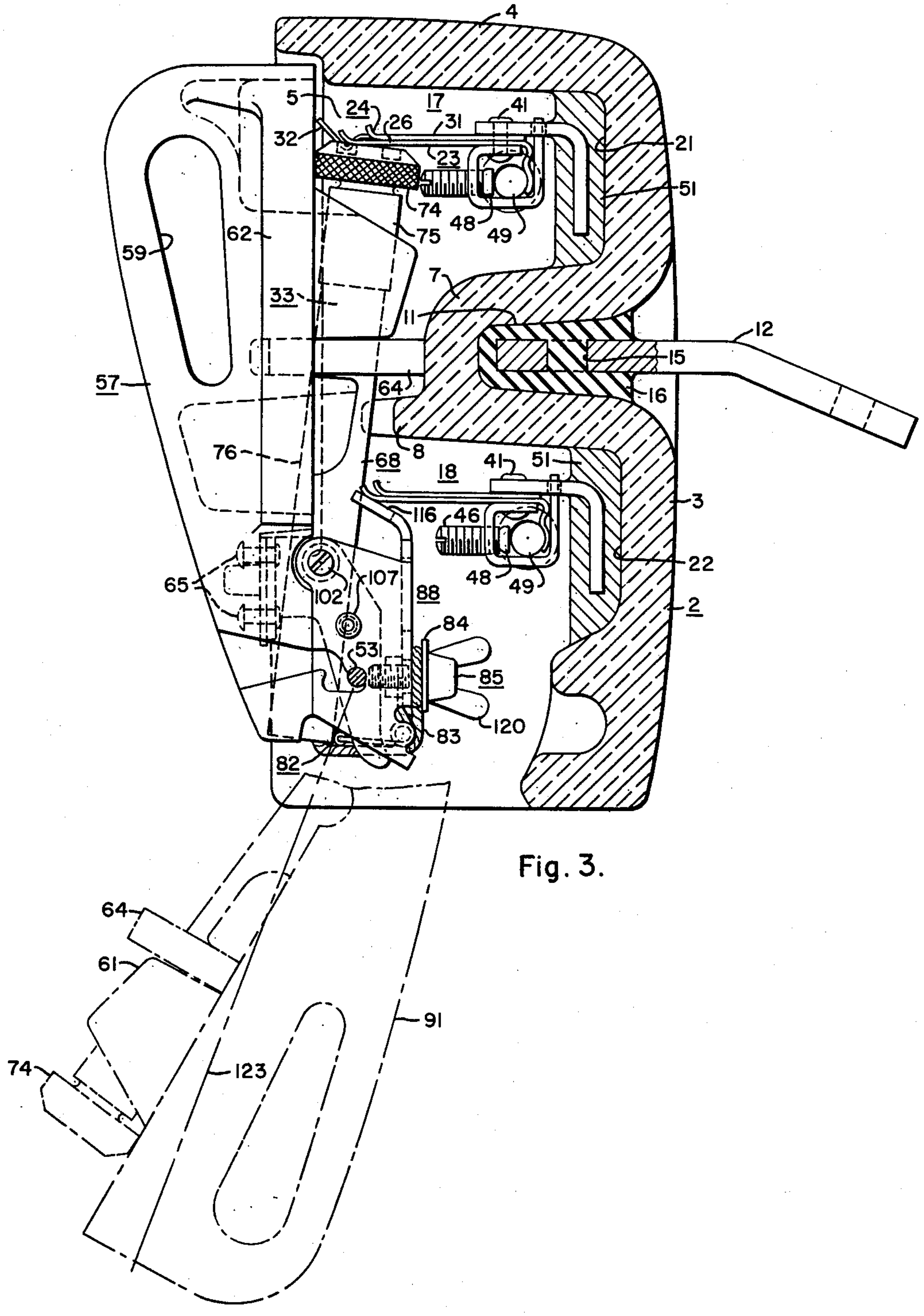
FIG. 3 illustrates a generally vertical sectional view taken through the enclosed fuse cutout of the present invention, the fuseholder door being shown in side elevation, and the fuse cutout being illustrated in its operative condition for carrying line current therethrough.
Figures 4, 5:
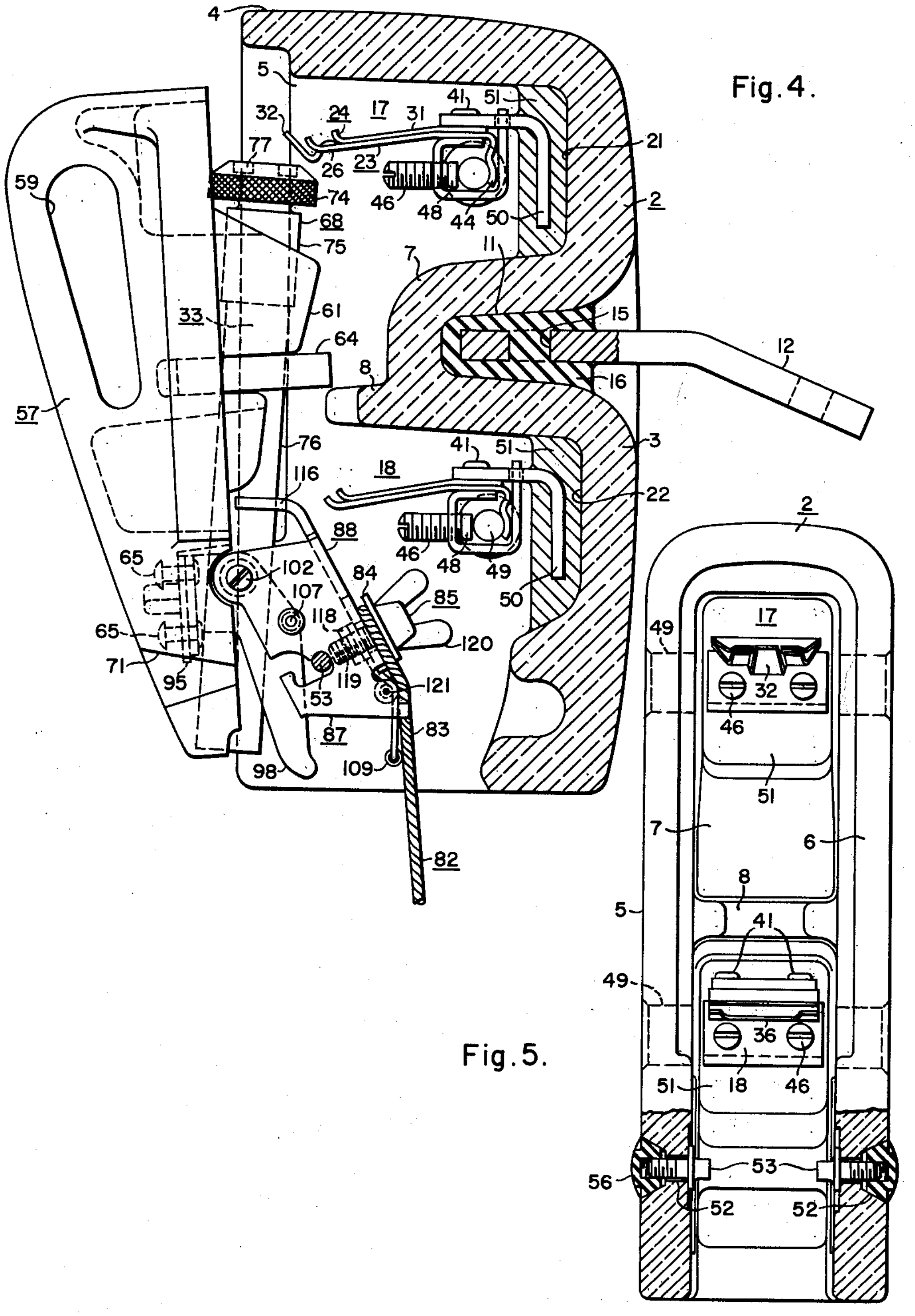
FIG. 4 is a view similar to that of FIG. 3, but illustrating the position of the fuse-cutout parts in an initial stage of its automatic dropout movement, with the toggle mechanism broken and the flipper device having withdrawn a portion of the fuse link.
FIG. 5 is a front elevational view looking into the open front of the fuse box, with the door omitted, and a portion of the side walls of the fuse box being illustrated in section to show the pivot-pin mounting construction.

As more clearly illustrated in FIGS. 4 and 5, the die-pressed porcelain box 2 comprises a rear wall 3, a top wall 4, and oppositely disposed side walls 5, 6. It will be noted, therefore, that the front and bottom of the porcelain box 2 are open. The rear wall 3 is provided with an inwardly extending protuberance 7 forming with an integral flange 8 a transverse baffle intermediate the ends of the insulating casing 2. The protuberance 7, as shown, is provided with a cavity 11 (FIG. 3) opening to the outer side of rear wall 3 and adapted to receive one end of a mounting bracket 12 for supporting the casing 2, for example, from a cross-arm hanger 13 (FIG. 7). A bolt 14 securing the mounting bracket 12 to the cross-arm hanger 13, as shown in FIG. 7, permits swiveling the cutout 1 relative to the cross-arm hanger 13 to the desired position.

As shown in FIGS. 3 and 4, the mounting bracket 12 may be apertured, as at 15, to provide better securement within a resilient cement 16 contained within the cavity 11. The cavity 11 may also be sanded during fabrication of the fuse casing 2 for additional strength of securement.

The resilient cement 16 is preferably a thermosetting cement comprising a glycidyl polyether of a polyhydric phenol having a 1,2-epoxy equivalency of between 1 and 2 and which is devoid of other reactive substituents than phenolic hydroxyl groups.

The resinous polymeric epoxide, also known as glycidyl polyethers, employed in accordance with the present invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such, for example, as 4,4'-dihydroxy-diphenyl-dimethyl-methane, 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such as for example as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

Reference may be had to United States Patent 2,773,043, issued December 4, 1956, to Florian J. Zukas, and assigned to the assignee of the instant application, for further procedural steps to be employed in forming the resilient cement 16. This resilient cement 16 has been found to have excellent weathering properties and because of its resilient characteristics minimizes shock conditions during heavy-fault current interruption, as more fully described hereinafter.

Within insulating casing 2 there is provided upper and lower contact assemblies 17 and 18, respectively, secured within cavities 21, 22, respectively, provided in the inner surface of rear wall 3 of the casing 2. The upper contact assembly 17 includes a forwardly projecting contact strip 23 (FIGS. 25, 26) of any desired conducting material, such, for example, as copper or the like, with a resilient backing strip 24, shown more clearly in FIGS. 27 and 28 of the drawings. Preferably, the backing strip 24 is formed from a suitable resilient material, such as phosphorus bronze.

The outer end of conducting strip 23 is preferably bifurcated, forming two resilient contact-plate portions 25, 26 as the furcations thereof. In addition, the outer end of the resilient backing strip 24 is preferably formed with three spaced tine portions, 27, 28 and 31. The outer tines 27, 31 overlie the furcations 25, 26, respectively, of contact strip 23, and the middle tine portion 28 is formed with a downwardly projecting end portion 32, adapted to project downwardly between the furcations 25, 26 of contact strip 23, to form a latch means for engagement with the upper end of a fusible device 33, as shown in FIG. 3.

Similarly, the lower contact assembly 18 includes a contact strip 34 and a resilient backing strip 35, the latter being formed from a resilient metallic material, such as phosphorus bronze. The outer end of the contact strip 34 is preferably provided with an arcuate cutout portion 36 (FIG. 29) for receiving the fusible device 33 when in operative position within casing 2, as shown in FIG. 3.

The contact and backing strips of both the contact assemblies 17, 18 are mounted in position between one side 37 of an elongated box-shaped support terminal 38 (FIG. 35) and the lower side 39 (FIG. 33) of an angle-shaped support bracket 40, a pair of rivets 41 being employed for the connection. As shown in FIG. 34, the support terminal 38 has a pair of integral lug portions 42, which extend through a pair of rectangularly-shaped openings 43 of support bracket 40. The rectangularly-shaped openings 43 are more clearly shown in FIG. 32.

It will be observed that contact strip 23 has a downwardly extending end portion 44 (FIG. 26), which is disposed within box-shaped support terminal 38, as more clearly shown in FIGS. 3 and 4 of the drawings. Lower contact strip 34 (FIG. 30) likewise has a depending portion 45, which is similarly positioned. A pair of terminal screws 46 are threaded into threaded apertures 47 (FIG. 34) of each support terminal 38 and have contacting shoe clamps 48 rotatably secured thereto at the inner ends thereof.

As a result of the foregoing construction, the line conductor and also the load conductor, not shown, may be threaded into the side lead openings 49 of casing 2 and forced under pressure by the contacting shoe clamps 48 directly against the curved depending receptive portions 44, 45 of contact strips 23, 34, respectively. As a result, no unnecessary joints are provided in the current path extending through the fuse cutout 1.

It will be noted that the angled support brackets 40 have an angled portion 50, which is cemented into the cavities 21, 22 of the casing 2. Any suitable cement, such as high-strength mineralead cement 51, may be employed. Mineralead is impervious to moisture and is not affected by vibrations or extreme temperature cycles. Jig assembly of the mounting brackets 40 and the contact clips 17, 18 may be employed in conjunction with the cementing process to insure accurate alignment of the contact assemblies within the fuse casing 2.

With reference to FIG. 5, it will be noted that the porcelain fuse housing 2 is die-pressed with a pair of oppositely disposed pivot-pin openings 52 formed in the side walls 5, 6 thereof. Threaded metallic pivot pins 53 and cooperating insulating nuts 56 form inwardly extending trunnions to removably pivotally support a fuseholder door, generally designated by the reference numeral 57.

Preferably, the fuseholder door 57 is formed of a suitable insulating material, such, for example, as porcelain, a synthetic resin, or the like. As more clearly shown in FIGS. 8–13, the molded door 57 is provided with an apertured handle 58, which may be manipulated by a switchstick at a distance, or by hand for the lower voltages. The opening 59 in the handle 58 may be grasped by the hand of the lineman, but preferably, for reasons of safety, switchstick operation is desirable with the prong of the switchstick inserted within the opening 59 to effect closing and opening rotative motion of the fuseholder door 57 about the pivot pins 53, as hereinafter more fully described.

Figure 8:
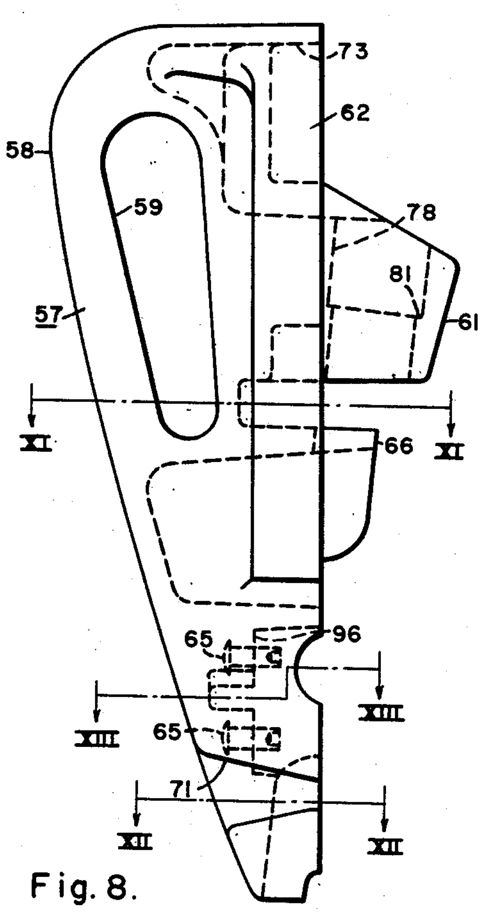
FIG. 8 illustrates, in side elevation, the molded fuseholder door only for the improved cutout of the present invention.
Figure 9:
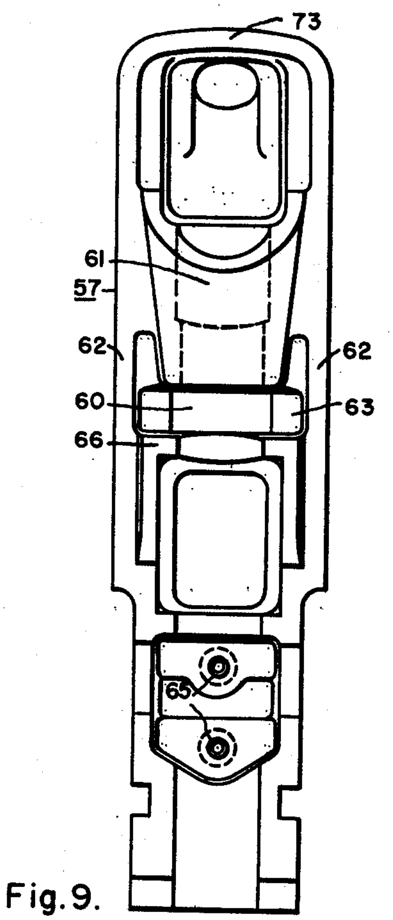
FIG. 9 is a rear elevational view of the molded door only of FIG. 8.
Figure 10:
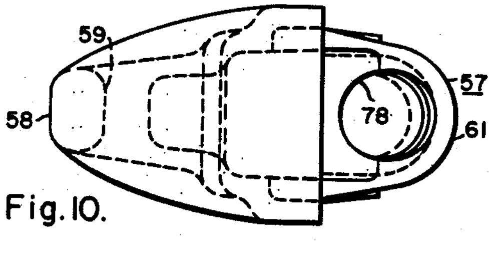
FIG. 10 is a top plan view of the molded door only of FIG. 8.
Figure 11:
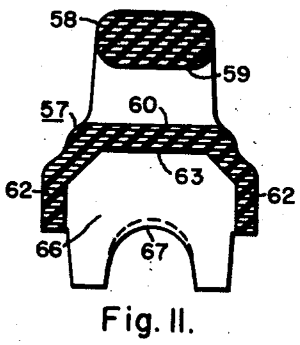
FIGS. 11–13 are sectional views taken respectively along the lines XI—XI, XII—XII, and XIII—XIII of FIG. 8, looking in the direction of the arrows.
Figure 12:
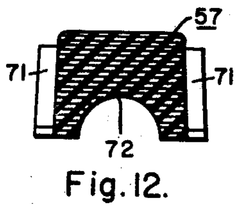
Figure 13:
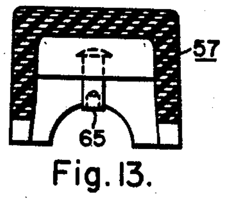

Fuseholder door 57 comprises a door panel 60 having a rearwardly integral apertured mounting projection 61, more clearly shown in FIGS. 8 and 10 of the drawings. In addition, door 57 has integral rearwardly extending longitudinal flanges 62, an intermediately disposed recess 63 for the accommodation of a sponge rubber, washer-shaped barrier member 64, and rivets 65 molded with the door. Also fuseholder door 57 has a transverse integral flange 66 (FIG. 11) with an arcuate cutout portion 67 for accommodating a tubular fuseholder, generally designated by the reference numeral 68. As indicated in FIG. 12, the lower portion of the molded door 57 is provided with a pair of trunnion-receiving flared notches 71 for receiving the pivot pins 53 on casing 2. In addition, an arcuate portion 72 of door panel 60 accommodates fuseholder 68. The top of the door 57 is provided with a top, inwardly extending flange portion 73 (FIG. 9).

The tubular fuseholder 68, as more clearly shown in FIGS. 2 and 4, comprises a top knurled terminal cap 74, which is threaded into a fuse ferrule 75, the latter, in turn, being threaded upon the upper threaded end of a fuse tube 76 and fixedly cemented thereto.

It will be noted that the terminal cap nut 74 of fusible device 33, as shown in FIGS. 3 and 4, has an annular groove 77, which is engaged by the latching portion 32 of upper contact assembly 17. FIG. 3 shows the latched condition.

The mounting aperture 78 of mounting projection 61 has a shoulder portion 81, which limits the downward movement of fuse ferrule 75 when tubular fuseholder 68 is inserted into mounting aperture 78.

As well known by those skilled in the art, a button-type fuse-link assembly, generally designated by the reference numeral 82, is inserted into the top of tubular fuseholder 68 following removal of knurled terminal cap 74. The buttonhead of the link assembled is clamped between the bottom of the terminal cap 74 and a threaded plug, not shown, threaded interiorly within fuse ferrule 75. The fuse link may be of the type described in United States Patent 2,343,723, issued March 7, 1944, to James M. Wallace, and assigned to the same assignee as the present application.

The lower cable or tail 83 of the fuse-link assembly 82 extends through the lower open end of the bore provided within fuse tube 76 and is clamped between a freely rotatable washer 84 of a terminal clamp 85 and the knurled side 86 (FIG. 20) of a pivotally mounted supporting link, or door hinge 87, shown more clearly in FIGS. 19 and 20 of the drawings. In the intact, or unblown condition of the fuse link 82, as illustrated in FIGS. 2 and 3, a toggle means 88 is maintained in its set or unbroken position. However, when fuse link 82 fuses upon overload or fault-current conditions, the cable 83 is released, and the toggle means 88 breaks, or collapses, as shown in FIG. 4, to permit lowering and outward movement of the fuseholder door 57 and consequent unlatching of terminal cap 74 from latching finger 28. The entire fuseholder door 57 then drops downwardly to the dropout indicating position shown by lines 91 of FIG. 3 and lines 92 of FIG. 7.

Preferably, the fuse tube 76 is composite in construction having an inner gas-evolving liner of fiber, or like material, and an outer surrounding casing of any suitable insulating material, such as synthetic resin. The evolution of the gas from the fiber liner during the drawing of the arc within the fuse-tube bore will assist in arc extinction, the evolved gas being expelled downwardly through the lower open end of the fuse tube 76 with expulsive action. This expulsive action will, of course, assist in the ejection of the lower remnant of the fuse link out of the fuse tube.

With reference to FIGS. 4 and 8, it will be noted that the rivets 65, molded with the door 57, are employed to secure fixedly in place a latch bracket, or catch 93, shown more clearly in FIGS. 14 and 15 of the drawings. The rivets 65 extend through holes 94 of latch bracket 93 and have their inner ends swaged, or peened over to rigidly mount the latch bracket 93 on the door 57. Preferably, a resilient rubber pad of generally rectangular configuration is disposed between the inner side of the door panel 60 at the bottom of a recess 96 (FIG. 8) and the bight portion 97 of latch bracket 93 for minimizing shock imposed upon the molded door 57 during operation of the cutout. The pad 95 is, of course, provided with apertures to accommodate the pair of rivets 65.

As shown in FIGS. 14 and 15, the legs 98 of latch bracket 93 have three threaded bushings 99 brazed within holes 101 provided in the sides 98 of the latch bracket 93. The upper two bushings 99 receive the inner ends of pivot screws 102 (FIG. 3), the shank portions of which pass with clearance through pivot holes 103 (FIG. 19) of supporting link 87. The inner extremities of the two pivot screws 102 extend within bored openings, or recesses provided in the side walls of fuse tube 76. These recesses, not shown, do not, however, extend to the inner surface of the bore extending through fuse tube 76. Thus, the inner ends of the pivot screws 102 serve to fixedly attach the fuseholder 68, including the fuse tube 76, to the door 57. By unscrewing the pivot screws 102, however, the supporting link 87 may readily be removed from the latch bracket 93, or door 57, and the freed fuse tube 76 may be removed from door 57 by upward withdrawal movement through mounting aperture 78 of projection 61. When desired, a new fuse tube 76 may be substituted in this manner for an old fuse tube 76.

The toggle means 88 comprises the fuseholder 68 as one leg of the toggle, and the supporting link 87 as the other leg of the toggle. As shown in FIGS. 2 and 19, the supporting link 87 has provided adjacent the lower end thereof a slot 104 opening to one edge of the link and having a reentrant portion 105 at the inner end thereof for receiving the pivot pins 53 supported upon the side walls 5 and 6 of the casing 2. By the provision of such a slot 104 in supporting link 87, it will be apparent that the link 87 may be readily attached and detached with respect to supporting pivots 53 by movement of the link 87 to cause entrance or exit of supporting pins 53 into slots 104. In the position of the parts shown in FIG. 2 of the drawings, it will be noted that slot 104 in the supporting link 87 lines up with the notches 71 provided in opposite side edges of door panel 60 to permit the link 87, when assembled with the fuseholder 68 and door 57, to be engaged or disengaged with pivot pins 53. The notches 71 in the door panel 60 are, as shown, flared outwardly to facilitate easy entrance of pivot pins 53 into the notches 71 and slots 104 in the supporting link 87.

The lower threaded bushing 99, as shown in FIG. 15, accommodates a converting screw 106, which passes with clearance through hole 107 (FIG. 19) of link 87, and thereby adapts the fuse cutout 1 for non-dropout operation. Removal of this converting screw 106, which is mounted in place at the factory, provides dropout operation, since the toggle means 88 is then free to collapse, as shown in FIG. 4. If the converting screw 106 is maintained in position, as supplied from the factory, the supporting link 87 is rigid with latch bracket 93 and door 57, and the toggle means 88 is rendered inoperable.

Thus, a lineman may easily and quickly convert the fuse cutout 1 from non-dropout operation to dropout operation by merely removing the converting screw 106. Obviously, this conversion operation may even be performed without any difficulty while the lineman is on the pole.

With reference to FIGS. 21 and 22 of the drawings, it will be noted that a spring latch, generally designated by the reference numeral 108, is mounted at the lower end of the supporting link 87. This spring latch 108, mounted upon the door-hinge assembly, permits only a correct and controlled force upon the fuse link and aids the fuse cutout 1 in clearing faults. It also serves as a fuse-link flipper, indicating a blown fuse when the fuse cutout 1 is adjusted for non-dropout operation.

The spring latch 108, as shown in FIGS. 21 and 22, includes an elongated metallic sleeve 109 threaded upon the bight portion of a biasing spring 110 comprising two torsion-spring sections 111. The ends 112 of the torsion springs 111 bear upon the under side of the bight portion 86 of supporting link 87. Intermediate portions 113 of the spring wire bear against inwardly extending lugs 114 constituting integral extremities of the legs 115. The elongated metallic sleeve 109 is free to roll about the bight portion of the biasing spring means 110, as will be evident from an inspection of FIG. 21.

As shown in FIG. 3, the spring-latch sleeve 109 not only exerts the proper pressure upon the fuse-link assembly 82, but also the metallic sleeve 109 latches behind the depending legs 98 of latch bracket 93 preventing breaking, or collapse of the toggle means 88 until after the fuse link has blown and permitted downward releasing movement of the latching sleeve 109, as shown more clearly in FIG. 4 of the drawings.

Whether the fuse cutout 1 is employed as a non-dropout cutout by utilization of the converting screw 106, or as a dropout cutout by discarding the converting screw 106, nevertheless the spring latch 108 will serve as an indicating, spring-actuated semaphore device clearly indicating a blown fuse condition. FIG. 6 may be referred to in this connection.

With reference to FIGS. 3 and 19, it will be noted that supporting link 87 has a contacting portion 116 with an arcuate cutout portion 117 for accommodating the fuse tube 76 in the closed-circuit position of the device, as shown in FIG. 3. The contacting portion 116 engages the lower contact strip 34 of lower contact assembly 18 with a wiping and pressural engagement. The upper terminal cap nut 74 likewise engages the contact plate furcations 25, 26 with pressural engagement. Thus, adequate contact pressure is provided in the latched closed position of the fusible device 1. This contact pressure tends to cause breaking or collapse of the toggle means 88, which is resisted by the fuse-link assembly maintaining the spring latch in its locking position, as shown in FIG. 3.

Referring to FIG. 19, it will be noted that a threaded bushing 118 is brazed to the back side of supporting link 87. The threaded bushing 118 threadedly receives the threaded shank portion of a terminal stud 119 having an integrally formed outer wing nut 120. The stud 119 and wing nut 120 are formed from the same stock, the threads being rolled upon the stock following positioning of the loose washer 84 thereon. The threads have an outer diameter greater than that of the hole through the washer so the washer 84 is held captive. Also, the inner extremity of the terminal stud 119 is upset to render the terminal clamp 85 captive upon the supporting link 87. The loose washer 84 prevents capstan action being exerted upon the fuse-link cable 83 to prevent thereby the imposition of undue stress upon the relatively weak fuse-link assembly 82.

By way of recapitulation, in the closed, circuit condition of the fuse cutout 1, as shown in FIG. 3, the fuse-link assembly 82 maintains the latching device 108 in its latching position, with the latching sleeve 109 positioned behind the depending legs 98 of the latch bracket. This prevents breaking of the toggle means 88 comprising the fuseholder 68 and the pivotally mounted supporting link 87. Since the toggle means 88 is extended, the terminal cap nut 74 is latched under the resilient latching finger 32, thereby maintaining the fuseholder door 57 in closed position covering the front of the insulating housing 2.

When the line conditions are such as to permit excessive current to flow through the cutout 1 by way of contact assemblies 17, 18 and fuse-link assembly 82, this excessive current will cause fusing of the fusible element disposed within the fuse tube 76 and associated with fuse-link assembly 82. The fusing of the fusible element will release the spring-biased latching device 108 causing it to rotate in a counterclockwise direction about its pivot axis 121. The torsion springs 111, encircling the sleeve 122, quickly force latching sleeve 109 to effect withdrawal of the lower remnant of fuse-link assembly 82 downwardly out of the lower open end of the fuse tube 76. Arc lengthening is thereby augmented, and an indication of a blown fuse condition is obtained. Simultaneously with the withdrawing motion of the fuse-link flipper 108, there occurs unlatching of the cutout toggle mechanism 88. Preferably, arc extinction occurs within fuse tube 76 prior to breaking or collapse of toggle means 88 to prevent any arcing at the contacts. The force exerted by the backup spring 24 of the top contact assembly 17 acts longitudinally of the fuseholder 68, and since the direction of this line of force is outwardly of the pivot pins 53 acts to break the toggle means 88, which is initially underset.

The lower backup spring 35 similarly acts to break the toggle means 88 and effect counterclockwise rotation of supporting link 87 about its pivot axis 53. The combined reaction of both contact spring forces, hence, is to effect outward and dropping movement of the fuseholder door 57 upon collapse of the toggle means 88. This will release the latching means 32 at the top contact assembly, and with the assistance of gravity the fuseholder door 57 will swing in a counterclockwise direction about the pivot pins 53 to the dotted open position 91 of FIG. 3. Usually, the fuse cutout 1 is tilted downwardly slightly, as shown in FIG. 7, so that the center of gravity of the door assembly falls on the vertical mounting center line indicated by the dot-dash line 123 of FIG. 3.

The lineman will, of course, notice the dropout position of the door, or if non-dropout operation is in effect, indication of the blown condition of the fuse device 33 will be had by the lowered flipper device 108, which serves as a semaphore. If dropout operation is in effect, the lineman will insert a prong of his switchstick within operating eye 124 (FIG. 20) provided in link 87 and remove the fuseholder door 57 from the pivot pins 53. If non-dropout operation is in effect, the lineman must first open the door 57 forcibly by pulling on the prong of the switchstick inserted within door opening 59.

Refusing is easily accomplished by unscrewing terminals 74 and 85, inserting a new button-head type of fuse link within fuseholder 68, screwing cap 74 back into position, and reclamping fuse cable 83 under loose washer 84 by tightening wing nut 120. The flipper device will, of course, also be reset during this operation.

The lineman will then replace the fuseholder door 57 upon the pivot pins 53, remove the switchstick, and reengage the prong thereof in hookeye 59 to effect closing of the door assembly 57. This will complete the circuit through the cutout.

In the case of extra heavy-duty operation, a heavier cast latch bracket 193 may be substituted for the latch bracket 93 of FIGS. 14 and 15. FIGS. 16–18 illustrate the heavier cast latch bracket 193. It will be noticed that apertures 94 are provided to receive the rivets 65. Also an extra transverse strut 125 is employed for rigidity. Bushing portions 199 are integrally formed with the latch bracket 193 in this particular modification. The upper aperture 126, of course, receives the fuse tube 76 when the latter is placed in its operative position. The latch bracket 193 may, for example, be made of cast bronze. The depending legs 198 serve the same function as the legs 98 of the latch bracket 93 of FIGS. 14 and 15.

From the foregoing description it will be apparent that there is provided an improved circuit-interrupting structure. Certain features have particularly advantageous cooperation with fusible devices, such as enclosed fuse cutouts.

It will be noted that the supporting link 87 is a one-piece construction, whereas the cutout described in the aforesaid Rawlins patent had a two-piece supporting-link construction. The result is a more effective device involving fewer parts and serving to cut down assembly time. The contact assemblies 17, 18 are simple to assemble, involve few parts and provide excellent current conduction with a minimum of joints for the current path. The sponge rubber barrier 64, in conjunction with the transverse flange 8, prevents flashover between the contact assemblies 17, 18 during operation of the cutout.

Particularly important is the use of a resilient cement 16 for mounting the support bracket 12 within cavity 11. Shock is minimized, and a secure attachment is also obtained. The particular clamping arrangement 85 prevents capstan action imposed upon the relatively fragile fuse-link assembly, and yet is captive upon the supporting link 87.

The spring-biased latch device 108 prevents breaking of the toggle linkage 88 until the arc is extinguished within the fuse tube 76, and, in addition, effects withdrawal of the fuse-link cable from the bore of the fuse tube for rapid arc lengthening and semaphore indication of a blown link.

Of particular advantage is the convertibility of the improved fuse cutout 1 from non-dropout operation to dropout operation by removal of a single converting screw 106.

As proof of the effective operation of the fuse cutout 1, the device has interrupted 10,000 amps. at 5.2 kv. and 14,000 amps. at 2.6 kv. It is suitable for carrying a continuous current of up to 100 amperes without excessive heating, and is suitable for the voltage range of 2.6 kv. through 7.8 kv. The use of the resilient cement 16, for securing the mounting bracket 12, aids in withstanding wide ambient temperature variations during field operation of the cutout. This is a very important advantage of the cement.

Although there have been illustrated and described various modifications of the invention and embodiments thereof, it is to be clearly understood that the same were merely for the purpose of illustration, and that changes and modifications may readily be made therein by those skilled in the art without departing from the spirit and scope of the invention.

I claim as my invention:

1. An enclosed fuse cutout comprising, in combination, an insulating housing having pivot means disposed adjacent one end thereof and an open front, a pair of spaced line contacts mounted on the rear wall of said housing, at least the line contact more remote from said pivot means being resilient, a door assembly pivotally mounted on said pivot means and adaptable to close the open front of said housing, said door assembly carrying on the rear side thereof a pivotally-mounted door hinge and also a fuse holder having a fuse terminal, said fuse holder comprising a fuse tube having an open end, said door hinge having terminal means thereon, a latch member secured to the rear side of the door assembly and having a latching portion, pivot means on said door hinge and pivotally engaging the housing pivot means for pivotal mounting of the door assembly to the housing, said fuse holder terminal and said terminal means engaging said spaced line contacts in the closed-circuit position of the cutout with the fuse holder terminal engaging said resilient line contact, a rotatable latch arm pivotally mounted adjacent the rear end of said door hinge and having a fuse-link engaging portion adjacent the free end thereof, said latch arm latching about the latching portion of said latch member in the fused operable condition of the cutout, a fuse-link extending through said fuse tube and over the fuse-link engaging portion of said latch arm and connecting the fuse terminal with the terminal means, whereby said door hinge and said fuse holder constitute an underset toggle means releasable by rupture of the fuse-link.

2. The combination according to claim 1, wherein non-dropout operation is achieved by a converting member which fixedly secures the door hinge to the door assembly.

3. An enclosed fuse cutout comprising, in combination, an insulating housing having pivot means disposed adjacent one end thereof and an open front, a pair of spaced line contacts mounted on the rear wall of said housing, at least the line contact more remote from said pivot means being resilient, a door assembly pivotally mounted on said pivot means and adaptable to close the open front of said housing, said door assembly carrying on the rear side thereof a pivotally-mounted door hinge and also a fuse holder having a fuse terminal, said fuse holder comprising a fuse tube having an open end, said door hinge having terminal means thereon, a latch bracket secured to the rear side of the door assembly and having a latching portion disposed rearwardly of the open end of the fuse tube, pivot means on said door hinge and pivotally engaging the housing pivot means for pivotal mounting of the door assembly to the housing, said fuse holder terminal and said terminal means engaging said spaced line contacts in the closed-circuit position of the cutout with the fuse holder terminal engaging said resilient line contact, a latch arm carrying a combined latch bar and fuse-link ejector adjacent one end thereof, means pivotally mounting the other end of said latch arm adjacent the rear end of said door hinge so that in the latching position said combined latch bar and fuse-link ejector will latch about the latching portion of said latch bracket and be disposed between the latching portion and the open end of the fuse tube, a fuse-link extending through said fuse tube and over said latch bar and connecting said fuse terminal with said terminal means, whereby said door hinge and said fuse holder constitute an underset toggle means releasable by rupture of the fuse link.

4. In a door and fuse assembly for an enclosed fuse cutout, a housing door member, a fuse-tube member, means detachably securing said members together including a pair of pivot screws, a latch bracket secured to said housing door member, a supporting link, and said pivot screws providing a pivotal mounting for said supporting link.

5. The door and fuse assembly of claim 4, wherein a converting screw is employed to rigidly secure said latch bracket to said supporting link.

6. A door and fuse assembly for an enclosed fuse cutout including a door housing member and latch bracket, securing means including one or more rivets molded integrally with the door member for rigidly securing said latch bracket into position, a supporting link pivotally mounted upon said latch bracket, a fuse tube supported upon said door member, said supporting link and said fuse tube constituting a collapsible toggle means, a fuse link extending through the bore of said fuse tube, terminal means carried by said supporting link, one end of said fuse link being attached to said terminal means for maintaining said toggle means in an underset position, and the pivot screws utilized to pivotally mount the supporting link extending laterally into the side walls of the fuse-tube to fixedly secure the latter into position relative to the door.

7. An enclosed fuse cutout including a fuse box and a cooperating door assembly, a latch bracket having a mounting aperture therethrough fixedly secured to the door assembly, a fuse tube mounted upon the door assembly, and the fuse tube passing through the mounting aperture provided in the cast latch bracket, a supporting link pivotally mounted upon said latch bracket and carrying adjacent the rear end thereof a spring-biased latching device, and the latching device cooperating with said latch bracket to maintain said supporting link in a predetermined position.

8. An enclosed fuse cutout including an insulating fuse box mounting a spaced pair of resilient line contacts, a cooperating fuseholder door carrying a fuse tube with a fuse terminal, a supporting link pivotally mounted upon said door and having trunnion-receiving notches therein, pivot means associated with said fuse box for pivotally supporting said supporting link and door, terminal means carried by said supporting link including fuse-link cable-clamping means, a fuse link extending through said fuse tube and electrically interconnecting said fuse terminal and said terminal means, said supporting link and said fuse tube constituting an underset toggle means in the operative condition of the fuseholder door, whereby rupture of the fuse link releases the toggle means and permits dropout action of the fuseholder door, and a converting member optionally being employed to rigidly secure the supporting link to the fuseholder door.

9. In a door and fuse assembly for an enclosed fuse cutout, a housing door member, a fuse-tube member having a bore therethrough, a generally U-shaped latch bracket secured to the door member and having a pair of leg portions, a supporting generally U-shaped link, means pivotally connecting said generally U-shaped supporting link to said generally U-shaped latch bracket, terminal means carried by said supporting link, a terminal for said fuse-tube member, fuse link means extending through said bore of the fuse-tube member and electrically interconnecting said terminal means with said fuse tube terminal, said supporting link and latch bracket constituting an underset toggle means releasable by rupture of the fuse link, and a spring-biased generally U-shaped latch means cooperable with said leg portions to prevent breaking of said underset toggle means until rupture of said fuse link.

10. The combination of claim 9, wherein the latch means includes a generally U-shaped biasing spring.

11. The combination of claim 10, wherein a pin carried by the supporting link provides the support for the helical end portions of the spring.

12. The combination of claim 9, wherein threaded bushings are secured to the leg portions and serve to seat pivot screws.

13. The combination of claim 12, wherein an additional bushing is provided on one of the leg portions to receive a converting screw of non-dropout operation, and a converting screw received within said additional bushing passes through an aperture in one of said leg portions.

14. The combination set forth in claim 1 wherein means are provided to bias said latch arm in such a direction as to tend to withdraw the fused remnant of the fuse-link out of the open end of the fuse tube upon blowing of the fuse-link.

15. The combination according to claim 3, wherein means are provided to bias the latch arm in such a direction as to tend to withdraw the fused remnant of the fuse-link out of the open end of the fuse tube upon blowing of the fuse-link.

16. An enclosed fuse cutout comprising, in combination, an insulating housing having pivot means disposed adjacent one end thereof and an open front, a pair of spaced line contacts mounted on the rear wall of said housing, at least the line contact more remote from said pivot means being resilient, a door assembly pivotally mounted on said pivot means and adaptable to close the open front of said housing, said door assembly carrying on the rear side thereof a pivotally-mounted door hinge and also a fuse holder having a fuse terminal, said fuse holder comprising a fuse tube having an open end, said door hinge having terminal means thereon, a latch member secured to the rear side of the door assembly and having a latching portion, pivot means on said door hinge and pivotally engaging the housing pivot means for pivotal mounting of the door assembly to the housing, said fuse holder terminal and said terminal means engaging said spaced line contacts in the closed-circuit position of the cutout with the fuse holder terminal engaging said resilient line contact, a rotatable fuse-link retracting latch arm pivotally mounted adjacent the rear end of said door hinge and having the free end thereof swingable adjacent the open end of the fuse tube, said latch arm latching about the latching portion of said latch member in the fused operable condition of the cutout, a fuse-link extending through said fuse tube and engaging said latch arm and connecting the fuse terminal with the terminal means, whereby said door hinge and said fuse holder constitute an underset toggle means releasable by rupture of the fuse link.

17. The combination set forth in claim 16, wherein means are provided to bias said latch arm in such a direction as to tend to withdraw the fused remnant of the fuse-link out of the open end of the fuse tube upon blowing of the fuse link.

18. An enclosed fuse cutout comprising, in combination, an insulating housing having pivot means disposed adjacent one end thereof and an open front, a pair of spaced line contacts mounted on the rear wall of said housing, at least the line contact more remote from said pivot means being resilient, a door assembly pivotally mounted on said pivot means and adaptable to close the open front of said housing, said door assembly carrying on the rear side thereof a pivotally-mounted door hinge and also a fuse holder having a fuse terminal, said fuse holder comprising a fuse tube having an open end, the pivot location of the door hinge being intermediate the ends of the fuse holder, said door hinge having terminal means thereon, a latch member secured to the rear side of the door assembly and having a latching portion, pivot means on said door hinge and pivotally engaging the housing pivot means for pivotal mounting of the door assembly to the housing, said fuse holder terminal and said terminal means engaging said spaced line contacts in the closed-circuit position of the cutout with the fuse holder terminal engaging said resilient line contact, a rotatable latch arm pivotally mounted adjacent the rear end of said door hinge and having a fuse-link engaging portion adjacent the free end thereof, said latch arm latching about the latching portion of said latch member in the fused operable condition of the cutout, a fuse-link extending through said fuse tube and over the fuse-link engaging portion of said latch arm and connecting the fuse terminal with the terminal means, whereby said door hinge and said fuse holder constitute an underset toggle means releasable by rupture of the fuse-link with the knee pin of the toggle means at said pivot location of the door hinge.

19. The combination set forth in claim 18, wherein means are provided to bias said latch arm in such a direction as to tend to withdraw the fused remnant of the fuse-link out of the open end of the fuse tube upon blowing of the fuse link.

20. The combination according to claim 3, wherein non-dropout operation is achieved by a converting member which fixedly secures the door hinge to the door assembly.

21. The combination according to claim 16, wherein non-dropout operation is achieved by a converting member which fixedly secures the door hinge to the door assembly.

22. The combination according to claim 18, wherein non-dropout operation is achieved by a converting member which fixedly secures the door hinge to the door assembly.

References Cited in the file of this patent

UNITED STATES PATENTS

| | | |
|---|---|---|
| 441,933 | Cartwright | Dec. 2, 1890 |
| 1,485,556 | Ellmer et al. | Mar. 4, 1924 |
| 1,715,624 | Reisz | June 4, 1929 |
| 1,809,205 | Kyle | June 9, 1931 |
| 1,838,351 | Aldeen | Dec. 29, 1931 |
| 1,997,091 | Usselman | Apr. 9, 1935 |
| 2,081,814 | Hermann | May 25, 1937 |
| 2,081,826 | Lincks | May 25, 1937 |
| 2,138,255 | Schultz et al. | Nov. 29, 1938 |
| 2,170,676 | Bennett | Aug. 22, 1939 |
| 2,199,908 | Birkemaier | May 7, 1940 |
| 2,385,473 | Schultz | Sept. 25, 1945 |
| 2,458,743 | Schultz | Jan. 11, 1949 |
| 2,513,822 | Schultz | July 4, 1950 |
| 2,636,954 | Hellstern | Apr. 28, 1953 |
| 2,662,952 | Nivoix | Dec. 15, 1953 |
| 2,720,676 | Vigmostad | Oct. 18, 1955 |
| 2,726,298 | Koch | Dec. 6, 1955 |
| 2,744,982 | Smith et al. | May 8, 1956 |
| 2,780,793 | Gambale | Feb. 5, 1957 |
| 2,792,472 | Koch | May 14, 1957 |
| 2,900,618 | Geier | Aug. 18, 1959 |
| 2,901,576 | McCloud | Aug. 25, 1959 |
| 2,949,517 | McBride | Aug. 16, 1960 |